(12) United States Patent
Imhoff et al.

(10) Patent No.: US 11,546,001 B2
(45) Date of Patent: Jan. 3, 2023

(54) PREPROCESSOR FOR DEVICE NAVIGATION

(71) Applicant: Raytheon Company, Waltham, MA (US)

(72) Inventors: Scott Allen Imhoff, Parker, CO (US); Marcus Alton Teter, Belgrade, MT (US)

(73) Assignee: Raytheon Company, Waltham, MA (US)

( * ) Notice: Subject to any disclaimer, the term of this patent is extended or adjusted under 35 U.S.C. 154(b) by 1002 days.

(21) Appl. No.: 16/270,559

(22) Filed: Feb. 7, 2019

(65) Prior Publication Data

US 2019/0245564 A1     Aug. 8, 2019

Related U.S. Application Data

(60) Provisional application No. 62/627,963, filed on Feb. 8, 2018.

(51) Int. Cl.

| | |
|---|---|
| *H04L 12/28* | (2006.01) |
| *H04B 1/00* | (2006.01) |
| *H04B 17/21* | (2015.01) |
| *G01S 19/23* | (2010.01) |
| *G06N 20/00* | (2019.01) |
| *G01S 19/20* | (2010.01) |
| *G06N 3/12* | (2006.01) |
| *H04J 1/16* | (2006.01) |

(52) U.S. Cl.
CPC ............ *H04B 1/0003* (2013.01); *G01S 19/20* (2013.01); *G01S 19/23* (2013.01); *G06N 3/126* (2013.01); *G06N 20/00* (2019.01); *H04B 17/21* (2015.01)

(58) Field of Classification Search
CPC .......... H04B 17/3913; H04L 25/03101; G06N 20/00; G01S 5/0294; G01C 21/1652
USPC ........................................ 370/252, 329, 386
See application file for complete search history.

(56) References Cited

U.S. PATENT DOCUMENTS

| | | |
|---|---|---|
| 4,511,219 A | 4/1985 | Giles et al. |
| 5,481,269 A | 1/1996 | Imhoff et al. |
| 6,839,698 B2 | 1/2005 | Nguyen et al. |
| 10,726,738 B1 * | 7/2020 | Li ...................... G09B 19/0038 |
| 11,402,542 B2 * | 8/2022 | Rothenberg ............ G01W 1/10 |
| 2011/0106442 A1 | 5/2011 | Desai et al. |

(Continued)

OTHER PUBLICATIONS

Jaenisch, Holger, "Data Modeling enabled guidance, navigation, and control to enhance he lethality of interceptors against maneuvering targets", Proceedings of SPIE—The International Society for Optical Engineering, (2005), 12 pgs.

(Continued)

*Primary Examiner* — John Pezzlo
(74) *Attorney, Agent, or Firm* — Schwegman Lundberg & Woessner, P.A.

(57) ABSTRACT

A method for preprocessing data for device operations can include preprocessing measurement data using a machine learning technique, determining, by a Kalman filter and based on (1) the preprocessed measurement data or the measurement data and (2) prediction data from a prediction model predicting a measurement associated with the measurement data, corrected measurement data, and providing the corrected measurement data based on the predicted measurement and the preprocessed measurement data.

20 Claims, 8 Drawing Sheets

```
700
 │
 ▼
┌─────────────────────────────────────────┐
│ PREPROCESS LOCATION MEASUREMENT DATA    │──── 702
│ USING A MACHINE LEARNING TECHNIQUE      │
└─────────────────────────────────────────┘
                    │
                    ▼
┌─────────────────────────────────────────┐
│ DETERMINE, AT A KALMAN FILTER AND BASED │──── 704
│ ON (1) THE PREPROCESSED LOCATION        │
│ MEASUREMENT DATA OR THE OBJECT LOCATION │
│ MEASUREMENT DATA AND (2) LOCATION       │
│ PREDICTION DATA FROM A PREDICTION MODEL │
│ PREDICTING A LOCATION OF THE OBJECT,    │
│ CORRECTED OBJECT LOCATION DATA          │
└─────────────────────────────────────────┘
```

(56) References Cited

U.S. PATENT DOCUMENTS

2018/0156920 A1* 6/2018 Diggelen .......... H04L 25/03101
2019/0201075 A1* 7/2019 Shelton, IV ........... A61B 34/20
2019/0228256 A1 7/2019 Teter et al.

OTHER PUBLICATIONS

Jaenisch, Holger, "Data Modeling for Nonlinear Track Prediction of Targets through Obscurations", Proceedings of SPIE—The International Society for Optical Engineering, (2012), 23 pgs.

Jaenisch, Holger, "Spatial Voting with Data Modeling for Behavior Based Tracking and Discrimination of Human from Fauna from GMTI Radar Tracks", Proceedings of SPIE—The International Society for Optical Engineering, (2012), 16 pgs.

Jaenisch, Holger, et al., "Virtual Instrument Prototyping with Data Modeling", Thesis paper, (2009), 15 pgs.

Klir, George, et al., "Fuzzy Automata", Fuzzy Sets and Fuzzy Logic: Theory and Applications, Prentice-Hall, (1995), 349-352.

Revesz, G, "Automata and Their Languages", Introduction to Formal Languages, pp. 59-88, McGraw-Hill Book Company, (1983), 38 pgs.

* cited by examiner

US 11,546,001 B2

PREPROCESSOR FOR DEVICE NAVIGATION

RELATED APPLICATION

This application claims the benefit of priority to U.S. Provisional Patent Application Ser. No. 62/627,963, filed on Feb. 8, 2018, and titled "PREPROCESSOR FOR DEVICE NAVIGATION", which is incorporated by reference herein in its entirety.

TECHNICAL FIELD

Embodiments discussed herein regard devices, systems, and methods for improving accuracy of device measurements, such as position determination.

BACKGROUND

Position accuracy can be quite important. Consider that, a 1 nanosecond inaccuracy in a time used to determine a position of a satellite can result in a position error of about a foot. Increasing the position accuracy can be quite difficult due to the time constraints, as well as the complexity in orbital mechanics. Prior work on increasing navigation accuracy includes smoothing (a type of averaging) the measurement data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

For satellite position determination, the orbital position, or ephemeris, of the satellites can be precisely determined. The orientation of the Earth plays an important role in determining the position of the satellite. The orientation of the Earth in space is constantly changing. The Earth wobbles as it rotates due to the gravitation pull (tides) of the moon, sun, and other celestial objects. Even shifts in air and ocean currents and motions in Earth's molten core can influence Earth's orientation. Models of the Earth's orientation are inaccurate due, at least in part, to these shifts and wobbles. Thus, a model of satellite navigation that relies on the model of Earth's orientation also tends to be inaccurate. Embodiments help increase the accuracy of satellite position determination.

Figure 1:
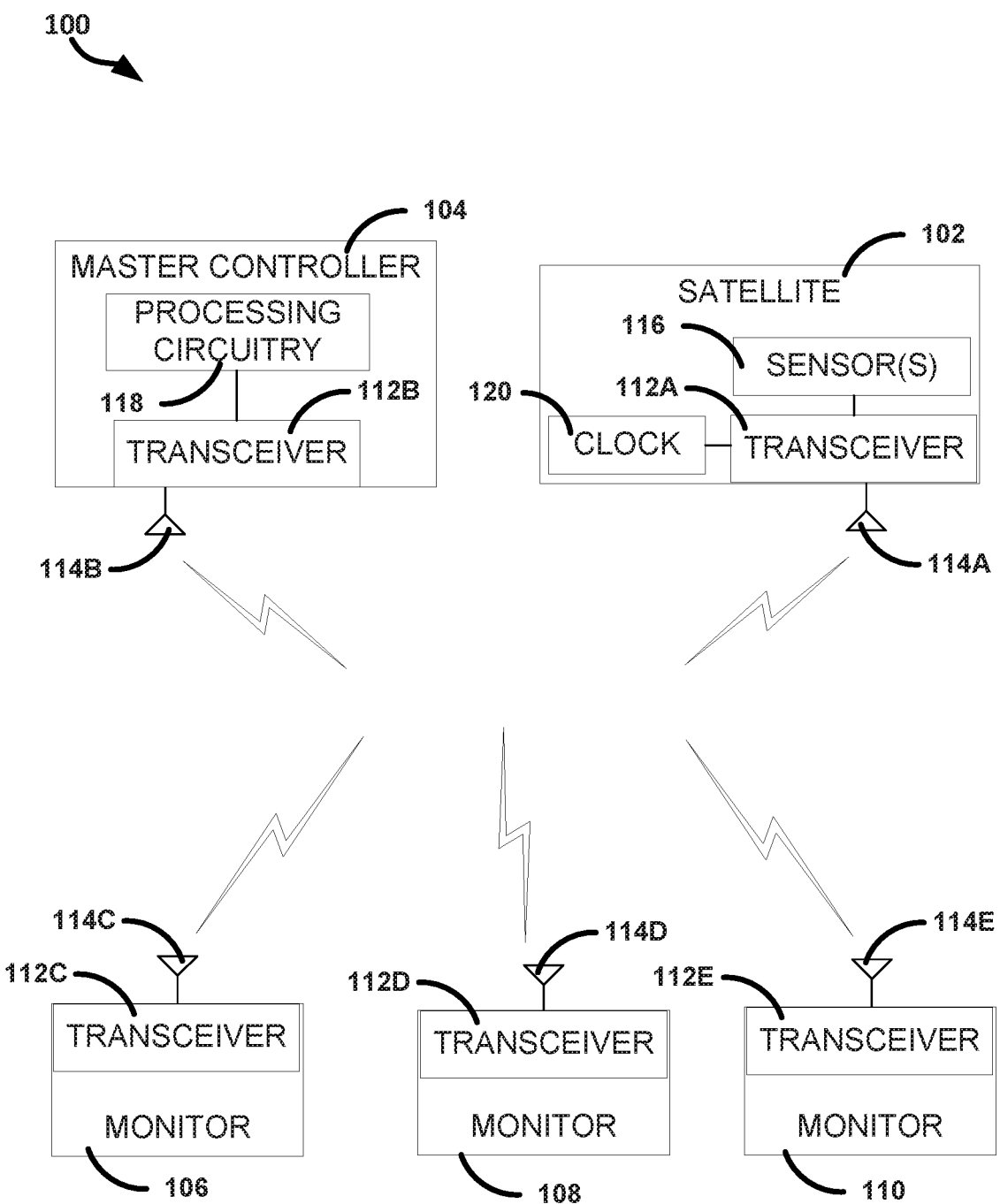
FIG. 1 illustrates, by way of example, a diagram of an embodiment of a system for satellite position determination.

FIG. 1 illustrates, by way of example, a diagram of an embodiment of a system 100 for satellite position determination. The system 100 includes a satellite 102, a master controller 104, and a plurality of monitors 106, 108, and 110. While embodiments are described with regard to satellite position determination, embodiments are applicable to measurements, such as position determination of associated celestial objects.

The satellite 102 can include a communication, remote sensing (e.g., weather, electromagnetic sensing, radar, lidar, or the like), navigation (e.g., global positioning system (GPS), Galileo, or the like), internet, radio, television, manned, unmanned, or other satellite. The satellite 102 is generally any device capable of communication with the monitor 106, 108, 110. The satellite 102 can be orbiting the Earth, whether in low Earth orbit (LEO), medium Earth orbit (MEO), or high Earth orbit (HEO).

The satellite 102 as illustrated includes sensor(s) 116, a transceiver 112A, and an antenna 114A. The transceiver 112A is a receive and transmit radio. The transceiver 112A receives electrical signals transduced by the antenna 114A. The transceiver 112A can demodulate data from such signals. The transceiver 112A can modulate data onto electrical signals. The antenna 114A can convert the modulated electrical signals to an electromagnetic wave that is transmitted to the monitor 106, 108, 110. The data modulated onto the wave can include Keplerian element data, as determined by the sensor(s) 116, or a time as provided by a clock 120. The clock 120 of a satellite 102 is often an atomic clock with a very high time accuracy (e.g., with a maximum drift of about 2 nanoseconds a year). The sensor(s) 116 can include electro optical sensor(s) (e.g., visible, infrared, or other electromagnetic radiation frequency sensor), three-axis accelerometer, gyroscope, temperature, weather, laser altimeter, lidar, radar, ranging instrument, scatterometer, sounder, radiometer, spectrometer, spectroradiometer, or the like.

Locations of satellites 102 can be determined using tracking from monitors 106, 108, 110. The monitors 106, 108, 1110 use mechanisms such as radar, signal Doppler, and laser reflectors to pinpoint the position of a satellite and to maintain an understanding of its orbital elements. Given Keplerian orbital elements, orbital mechanics can be used to calculate where the satellite 102 is at a specific point in time. The Keplerian elements are: epoch time that indicates the time at which the other values, inclination that indicates the angle between the equator and the orbit plane, eccentricity which is a constant defining the shape of the orbit (e.g., 0=circular, <1=elliptical), length of semi-major axis that is a constant defining the size of the orbit, true anomaly which indicates the angle between perigee and the satellite 102 (in the orbit plane), right ascension of the ascending node, the angle between vernal equinox and the point where the orbit crosses the equatorial plane (going north), and argument of perigee that indicates the angle between the ascending node and the orbit's point of closest approach to the earth (perigee). This information can be tabulated in an ephemeris (a table). Given the Keplerian elements and a time stamp from the satellite 102, the monitor 106, 108, 110 can calculate the position of the satellite 102.

Additionally, or alternatively, trilateration can be used by the master controller 104 to determine the position of the satellite 102. Each of the monitors 106, 108, 110 can each receive a communication from the satellite 102. A time between the transmission of communication at the satellite and reception of the communication at the monitors 106, 108, 110 can indicate how far away the satellite 102 is from the monitors 106, 108, 110. The distance to each of the monitors 106, 108, 110 can be used to determine the position of the satellite 102. This determination tends to be more accurate than the determination using the Keplerian elements (see, for example, FIG. 2).

The monitors 106, 108, 110 as illustrated include respective transceivers 112C, 112D, and 112E and respective antennas 114C, 114D, and 114E. The transceivers 112C-112E modulate data to be provided to the master controller 104 and receive electrical signals from the satellite 102. The data to the master controller 104 can include a time between transmission of a communication from the satellite 102 and reception of the communication at the monitor 110. The data to the master controller 104 can further include sensor data from the satellite 102.

The master controller 104 as illustrated includes the transceiver 112B, the antenna 114B, and processing circuitry 118. The transceiver 112B demodulates electromagnetic waves from the monitors 106, 108, 110. The processing circuitry 118 performs operations on the received data (and other data) to determine position correction information for the satellite 102. The processing circuitry 118 can include electrical components configured to perform the operations on the received data. The processing circuitry 118 can include one or more resistors, transistors, capacitors, diodes, inductors, logic gates (e.g., AND, OR, XOR, negate, buffer, or the like), regulators (e.g., voltage, current, or power), amplifiers, power supplies, analog to digital converters, digital to analog converters, multiplexers, switches, buck or boost converters, or the like. The processing circuitry 118 can include a processing unit, such as can include one or more central processing units (CPUs), graphics processing units (GPUs), field programmable gate arrays (FPGAs), application specific integrated circuits (ASICs), or the like. Two or more of the processing units 102 can operate in different number systems, such as in parallel, as is discussed in more detail with regard to FIG. 6.

The master controller 104 acts as a data processing center for information collected at the monitors 106, 108, 110. Orbit coordinates can be determined by trilateration and the orbit model (ephemeris). When the satellite drifts out of expected orbit, repositioning can be undertaken. The clocks may also be readjusted, but more usually information on time errors is attached to signals as correction factors. The computed corrections, time readjustments and repositioning information can be transmitted to the satellite via an uplink from the monitor 106, 108, 110.

Figure 2:
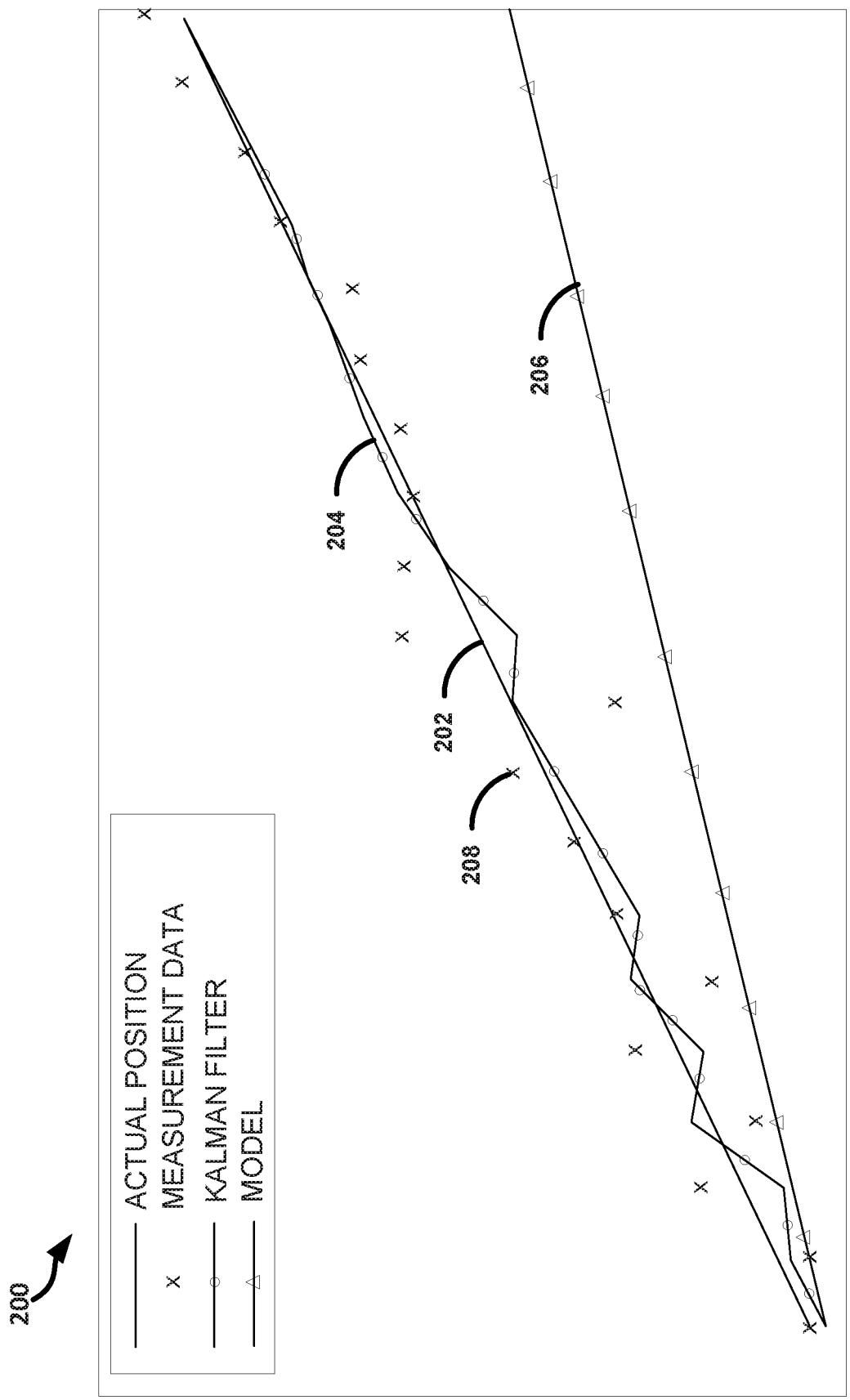
FIG. 2 illustrates, by way of example, a graph of a simulation of satellite position calculations.

FIG. 2 illustrates, by way of example, a graph 200 of a simulation of satellite position calculations. The position calculations include an actual position (indicated by line 202), a Kalman filtered estimate of the position (indicated by line 204), an ephemeral model estimate of the position (indicated by line 206), and measurement data of the position (indicated by points 208) made by the controller 104 or the monitor 106, 108, 110.

Kalman filters used for navigation can determine a weighted average of two sources of information for the location of a device: 1) measurement data based on the device's locations from monitor stations 106, 108, 110 and 2) data from an analytical model which attempts to predict the device's location. The Kalman gain determines this weighting. If a covariance of the measurement data is low, the Kalman filter relies, through the weighting, more on the measurement data than on the location model. This can be seen in the graph 200 as the consecutive "X" points get closer to each other, the closer the Kalman filter estimate of position (line 204) gets to the measurement data and the further the consecutive "X" points get from one another the closer the Kalman filter estimate of position (line 204) gets to the model estimate of the position (line 206). Relying on the measurement data can be preferred since it can result in better position, velocity and timing accuracy (PVTA) as compared to reliance on the model (indicated by the line 206).

Embodiments can include a preprocessor for the measurement data, which can cause the covariance of the measurement data to be lower and thus cause the Kalman filter to rely more on the measurement data (weight the measurement data higher than data from the model). Embodiments can preprocess the measurement data using a fuzzy genetic learning automata. This can result in better position, velocity and timing accuracy.

Embodiments can use fuzzy learning to preprocess the measurement data being fed to the Kalman filter. Embodiments can refrain from relying on smoothing. With fuzzy learning automata, candidate measurement values graduate through state transitions and are presented as better replacement alternatives for data which is problematic (e.g., associated with a higher covariance).

The fuzzy genetic learning automata preprocessor of embodiments can include a learning phase and a working phase. In the learning phase the automata can learn the patterns occurring in the measurement data. The automata can capture the patterns stemming from periodic aspects of what the device is experiencing: going in and out of eclipse, through variations in gravitational potential, etc. The learning automata can learn these patterns through genetic learning and capture them as allowed fuzzy state transitions represented in hypermatrices S1, S2, . . . . In the working phase, the preprocessor can provide outputs B1, B2, . . . , BN which can, when needed, replace measurement data, such as when doing so reduces the covariance. The preprocessor can drive the covariance lower so that 1) more weight is placed on the measurement data and 2) better measurement data is ingested by the Kalman filter. This is conducive to better position, velocity and timing accuracy.

Embodiments generally do not modify or improve the Kalman filter. Rather, embodiments provide the Kalman filter with better measurement data with the expectation that this will allow the Kalman filter to more accurately predict position, velocity, and timing accuracy. Embodiments provide an improvement that can be devoid of any kind of averaging. Instead actual candidate measurement values graduate through state transitions and are presented as better replacement alternatives for data which has a problem or is associated with a high covariance. One or more embodiments provide an ability to predict measurements and can supply useful, accurate measurements when there are measurement data dropouts or measurement data is otherwise not available or has high covariance.

Figure 3:
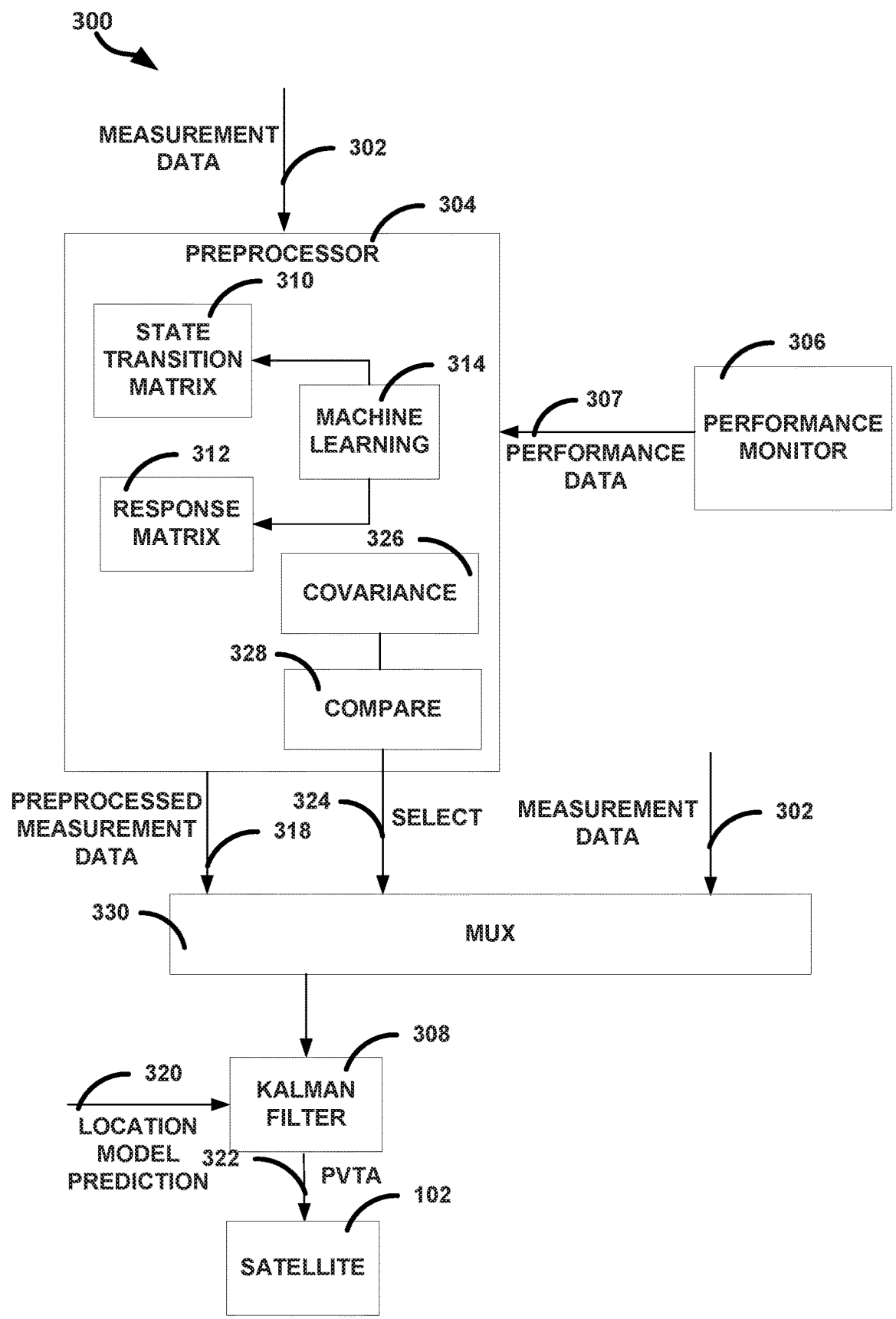
FIG. 3 illustrates, by way of example, a diagram of an embodiment of a system for Kalman filter data preprocessing.

FIG. 3 illustrates, by way of example, a diagram of an embodiment of a system 300 for Kalman filter data preprocessing. The system 300 as illustrated includes a preprocessor 304, a performance monitor 306, and a Kalman filter 308. The preprocessor 304 receives location measurement data 302 from the monitors 106, 108, 110, and measurement performance data 307, also from a monitor 106, 108, 110. The preprocessor 304 can be implemented using the processing circuitry 118 of the controller 104. Machine learning circuitry 314 (e.g., processing circuitry programmed to implement a machine learning technique) determines a state transition matrix 310 and a response matrix 312 based on the measurement performance data 307 and the measurement data 302.

The measurement data 302 is operated on by the state transition matrix 310 and the response matrix 312 to produce preprocessed measurement data 318. A covariance of the preprocessed measurement data 318 can be lower than a covariance of the measurement data 302. The Kalman filter 308 can receive preprocessed measurement data 318 and a location model prediction 320. The Kalman filter 308 can produce position, velocity, and time accuracy (PVTA) data 322 based on the preprocessed measurement data 318 and a location model prediction 320. The preprocessed measurement data 318 and the location model prediction 320 can include measurements or predictions of PVTA. The Kalman filter 308 can determine a weighted average of the received data. The weights of the data can be determined based on a covariance of data received at the Kalman filter 308. Data with a lower covariance can cause the Kalman filter 308 to place a higher weight on that data. The PVTA 322 can be provided to the satellite 102, such as can be navigating through space.

A class of machine learning techniques that can be implemented by the machine learning circuitry 314 includes genetic learning. A basic approach to genetic learning is to generate answer candidates and use feedback to determine how close the candidate is to optimal. Candidates can combine with each other and even mutate closer to optimal or farther from optimal. An answer candidate can be called a chromosome.

The chromosome is a representation of a solution candidate. In embodiments, the chromosome is a value, vector, matrix, or the like. A cost function may be thought of as a measure of the optimality of a chromosome. An inverse of a cost function is a fitness function. A cost function can include an L1 norm, L2 norm or the like. In embodiments, the cost function can include a difference or a squared difference between the data and an optimal solution. After the machine learning technique converges (does not change or changes less than a threshold amount for a specified number of iterations) the learned state transition matrix 310 and/or response matrix 312 can operate on the measurement data 302 to generate the preprocessed measurement data 318.

Through genetic learning, the pattern that the measurements go through (e.g., eclipses, etc.) is represented in the state transition matrix 310. Utilizing performance data 307, the state transition matrix 310 and the response matrix 312 evolve. After sufficient evolution (a fitness function can include reducing a covariance between consecutive measurement data) to produce the preprocessed measurement data 318.

Genetic learning is a search heuristic that is inspired by the theory of natural evolution. Genetic learning reflects the process of natural selection where the fittest individuals are selected for reproduction in order to produce offspring. The process starts with the selection of fittest individuals from a population. They produce offspring which inherit the characteristics of the parents and can be added to the next generation. If parents have better fitness, their offspring can be better than parents and have a better chance at surviving. This process keeps on iterating and at the end, a generation with the fittest individuals will be found.

Genetic learning can include five phases, initial population, fitness function, selection, crossover, and mutation.

The fitness function determines how fit an individual is (the ability of an individual to compete with other individuals). It gives a fitness score to each individual. The probability that an individual will be selected for reproduction is based on its fitness score. Embodiments can use a fitness function that reduces covariance between the measurement data and the preprocessed measurement data.

In the selection phase is to select the fittest individuals and let them pass their genes to the next generation. Two individuals (parents) can be selected based on their fitness scores. Individuals with high fitness have more chance to be selected for reproduction.

Figure 6:
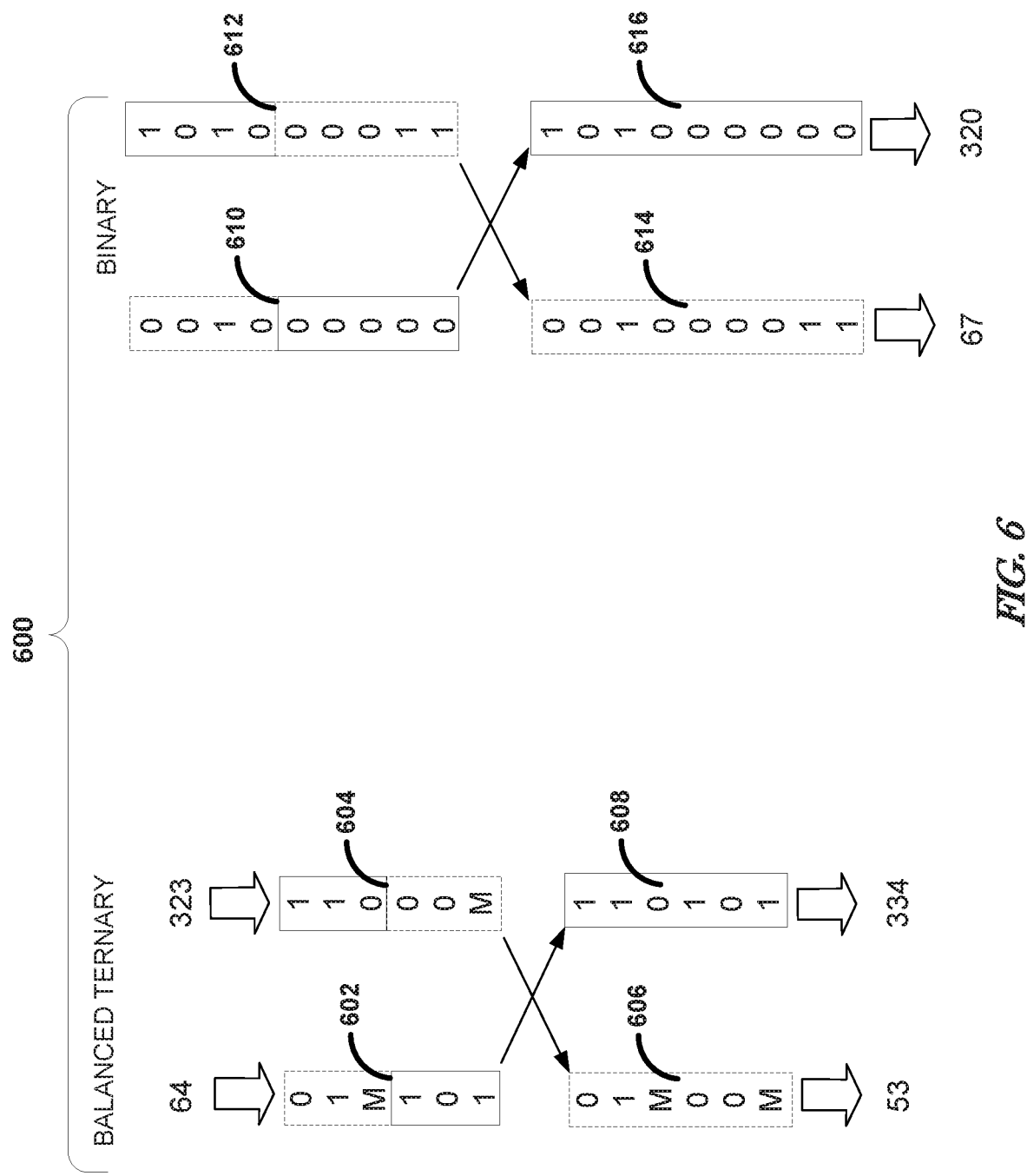
FIG. 6 illustrates, by way of example, a diagram of an embodiment of crossover in different number systems.

Crossover includes, for each pair of parents, a crossover point is chosen (e.g., at random) from within the genes. Crossover is illustrated in FIG. 6. Offspring are created by exchanging the genes of parents among themselves until the crossover point is reached. The new offspring can be added to the population.

In certain new offspring formed, some of their genes can be subjected to a mutation with a probability (e.g., random probability). This implies that some of the bits in the bit string can be flipped or changed to a different value. The population can have a fixed size. As new generations are formed, individuals with least fitness die, providing space for new offspring.

The preprocessor 304 can determine a covariance 326 between a moving window of consecutive measurement data 302. The covariance 326 is a measure of variation in the measurement data 302. The preprocessor 304 can compare the covariance 326 to a threshold covariance. If the covariance 326 is greater than (or equal to) the threshold, a select operation 324 can be asserted so that a multiplexer provides the preprocessed measurement data 318, in place of the measurement data 302, to the Kalman filter 308. The preprocessed measurement data 318 has a lower covariance as compared to the measurement data 302. Thus, the Kalman filter 308 will weight the preprocessed measurement data 318 higher than it would weight the measurement data 302. Thus, the Kalman filter 308, using the preprocessed measurement data 318, relies less on the location model prediction 320, thus making the location calculation more accurate.

The preprocessor 304 coupled with the Kalman filter 308 can provide more accurate PVTA than the PVTA of the graph 200. The accuracy in improvement can be realized when there are problems with the availability of measurements or the measurements are prohibitively noisy. The Kalman filter 308 can achieve a kind of weighted average of the PVT data from the location model prediction 320 and PVT data from the measurement data 302. If the measurement data 302 are noisy, the weighting favors the PVT data from the location model prediction 320 rather than the measurement data 318. By pre-processing the measurement data 302 with the preprocessor 304, the preprocessed measurement data 318 can be brought closer to truth and be smoother (e.g., reduced covariance), so the preprocessed measurement data 318 can be relied upon more heavily by the Kalman filter 308. This supports better, more accurate PVTA 322. With the preprocessor 304, positional accuracy down into the centimeters and even millimeters can be realized. Previously, the positional accuracy was on the order of meters, a factor of a hundred to even a thousand worse than embodiments of this disclosure.

Figure 4:
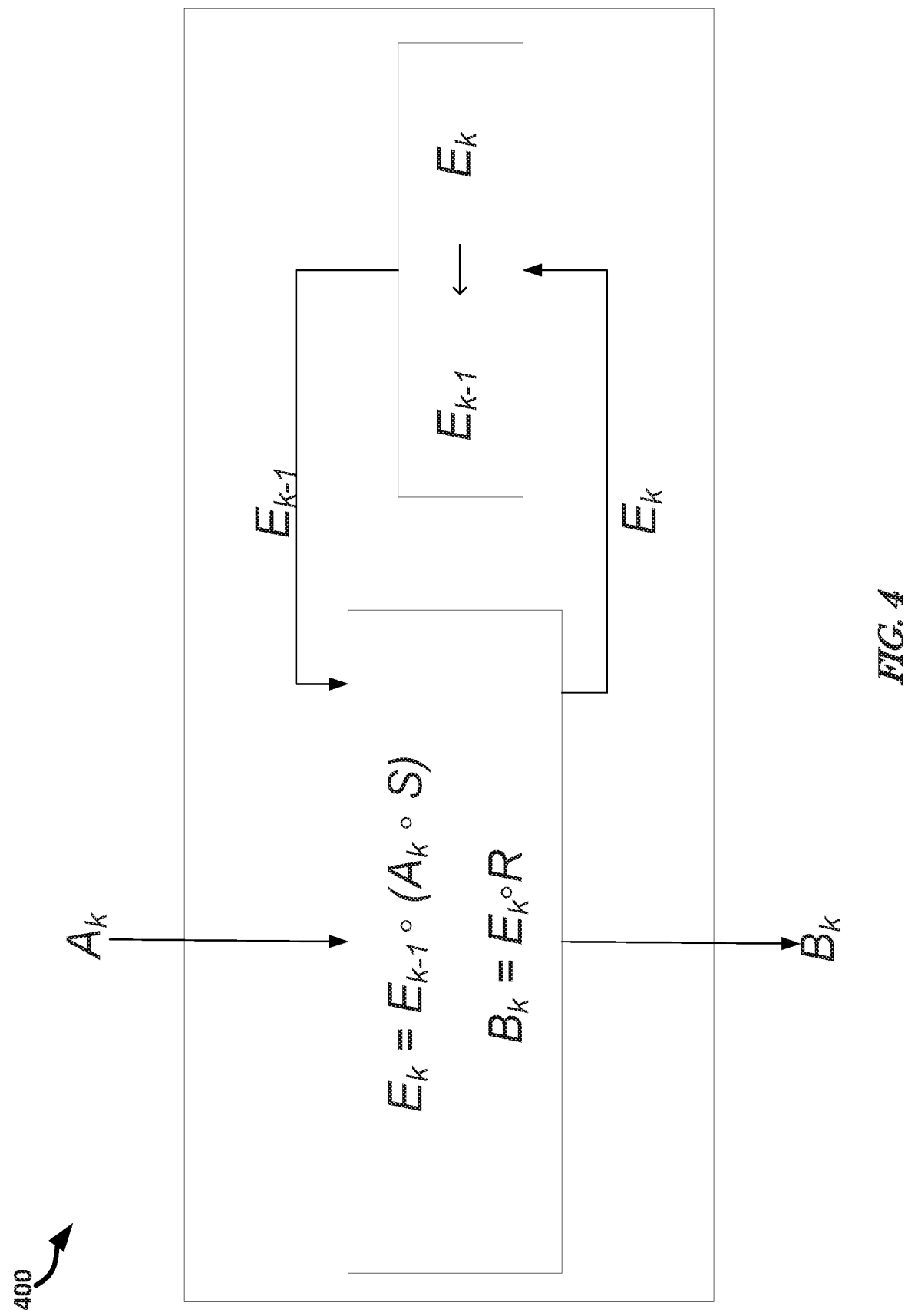
FIG. 4 illustrates, by way of example, a diagram of an embodiment of fuzzy learning operations.

FIG. 4 illustrates, by way of example, a diagram of an embodiment of fuzzy learning operations 400 that may be performed by the preprocessor in accord with some embodiments. The fuzzy learning operations 400 can include A, inputs (e.g., measurement data 302 or measurement performance data 307), E, a state, R, a response from entering a state, a state transition, S (represented by an arrow between states, E), and an aggregation operator, ∘.

The aggregation operator replaces, in a typical matrix multiplication technique, multiplication with a minimum operator and summation with a maximum operator. The following provides an example of normal matrix multiplication operation.

$$[1\ \ 0.8\ \ 0.6] \times \begin{bmatrix} 0 & 0.4 & 0.4 \\ 0.3 & 1 & 0 \\ 0.5 & 0 & 0 \end{bmatrix} =$$

$$[\text{sum}\{1 \times 0, 0.8 \times 0.3, 0.6 \times 0.5\}\ \text{sum}\{1 \times 0.4, 0.8 \times 1, 0.6 \times 0\}$$

$$\text{sum}\{1 \times 0.4, 0.8 \times 0, 0.6 \times 0\}] = [0.54\ \ 1.2\ \ 0.4]$$

What follows provides an example of the aggregation operation.

$$[1\ \ 0.8\ \ 0.6] \circ \begin{bmatrix} 0 & 0.4 & 0.4 \\ 0.3 & 1 & 0 \\ 0.5 & 0 & 0 \end{bmatrix} =$$

$$\begin{bmatrix} \max\{\min(1, 0), \min(0.8, 0.3), \min(0.6, 0.5)\} \\ \max\{\min(1, 0.4), \min(0.8, 1), \min(0.6, 0)\} \\ \max\{\min(1, 0.4), \min(0.8, 0), \min(0.6, 0)\} \end{bmatrix} = [0.5\ \ 0.8\ \ 0.4]$$

What follows is a simple example of processing measurement data 302 using the fuzzy learning operations of FIG. 4. Two consecutive operations are shown with superscripts indicating order of input, thus a superscript "1" indicates a first input and "2" indicates a next consecutive input after the input corresponding to the "1".

$$A^1 = [1\ \ .4]$$

$$S_A^1 = \begin{bmatrix} 0 & .4 & .4 & 1 \\ .3 & 1 & 0 & .4 \\ .5 & 0 & 0 & 1 \\ .4 & .3 & 0 & 1 \end{bmatrix}$$

$$E^1 = C \circ S_A^1 = [1\ \ .8\ \ .6\ \ .4] \circ \begin{bmatrix} 0 & .4 & .4 & 1 \\ .3 & 1 & 0 & .4 \\ .5 & 0 & 0 & 1 \\ .4 & .3 & 0 & 1 \end{bmatrix} = [.5\ \ .8\ \ .4\ \ 1]$$

$$B^1 = E^1 \circ R = [.5\ \ .8\ \ .4\ \ 1] \circ \begin{bmatrix} 1 & 0 & 0 \\ 0 & 1 & 0 \\ 0 & 0 & 1 \\ .5 & 1 & .3 \end{bmatrix} = [.5\ \ 1\ \ 4]$$

$$A^2 = [0\ \ 1]$$

$$S_A^2 = \begin{bmatrix} 0 & 0 & 1 & 0 \\ .2 & 0 & 0 & 1 \\ 0 & 0 & 0 & 1 \\ 1 & .3 & 0 & .6 \end{bmatrix}$$

$$E^2 = E^1 \circ S_A^2 = [.5\ \ .8\ \ .4\ \ 1] \circ \begin{bmatrix} 0 & 0 & 1 & 0 \\ .2 & 0 & 0 & 1 \\ 0 & 0 & 0 & 1 \\ 1 & .3 & 0 & .6 \end{bmatrix} = [1\ \ .3\ \ .5\ \ .8]$$

$$B^2 = E^2 \circ R = [1\ \ .3\ \ .5\ \ .8] \circ \begin{bmatrix} 1 & 0 & 0 \\ 0 & 1 & 0 \\ 0 & 0 & 1 \\ .5 & 1 & .3 \end{bmatrix} = [1\ \ .8\ \ .5]$$

Figure 5:
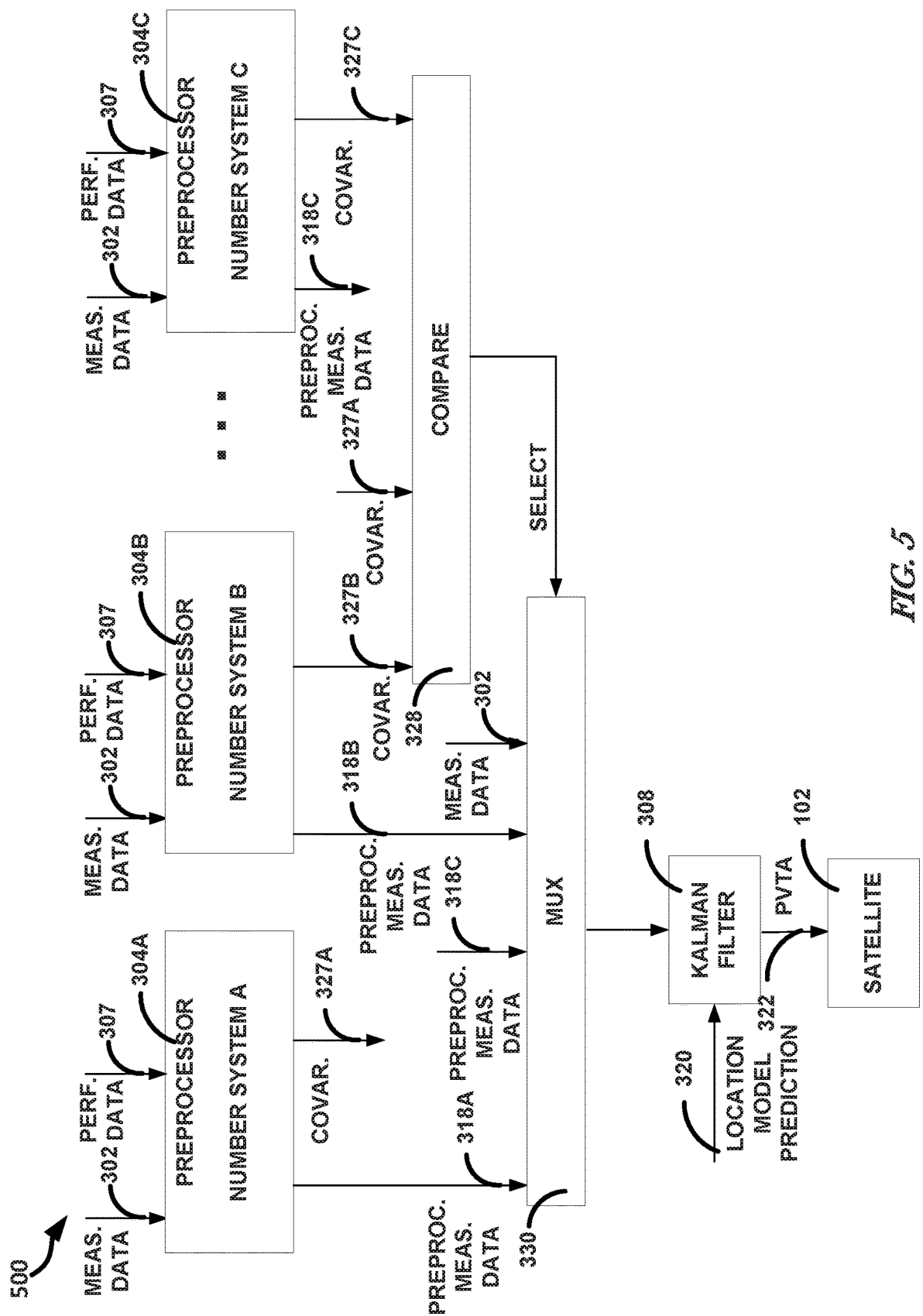
FIG. 5 illustrates, by way of example, a diagram of an embodiment of a system for accelerated genetic learning.

FIG. 5 illustrates, by way of example, a diagram of an embodiment of a system 500 for accelerated genetic learning. The system 500 as illustrated includes a number of a preprocessors 304A, 304B, 304C, each of which operates in a different number system (e.g., binary, ternary, balanced ternary, hexadecimal, base 10, base 9, or the other number system). Each of the preprocessors 304A-304C can implement the machine learning operations in a different numerical base, such as to provide more variation in the crossover or mutation process than would otherwise be possible using the same numerical base. Some downstream changes are made to determine which number system provides a state transition matrix 310 and response matrix 312 that corresponds to the lowest covariance between the preprocessed measurement data 318A, 318B, 318C and the measurement data 302, respectively. The compare operation 328 determines which preprocessed measurement data 318A-318C to provide to the Kalman filter 308 based on the covariance 327A-327C. The output of the machine learning operation that generates the lowest covariance can be fed back into each of the preprocessors 304A-304C as a parent. This speeds up the genetic evolution of the state transition matrix 310 to converge on an acceptable result.

FIG. 6 illustrates, by way of example, a diagram of an embodiment of crossover 600 in different number systems. The numbers 602 and 604 are entries in the state transition matrix 310. The numbers 602 and 604, in the example of FIG. 6 are in balanced ternary. In balanced ternary, the values −1 (M for "minus" in FIG. 6), 0, 1 are used to represent the entry values in the state transition matrix 310. The least significant three alleles are chosen for cross over in the balanced ternary example of FIG. 6. After cross-over the numbers 64 and 323 become 53 and 334, respectively. The numbers 606, 608 represent the children 53 and 334 in balanced ternary.

A similar crossover is illustrated for the same numbers in binary. The parent numbers 610 and 612 represent state transition matrix entries in binary. The crossover point is the least significant five alleles. After crossover, the child numbers 614 and 616 are produced. The children 606, 608 and 614, 616 can correspond to different fitness scores (e.g., covariance values). The children from the machine learning technique that correspond to the best fitness score can be fed back into all of the preprocessors 304A-304C as next generation data.

Using multiple number systems helps converge on an optimal state transition matrix faster. In some simulations, time to convergence was reduced by 50% or more.

Figure 7:
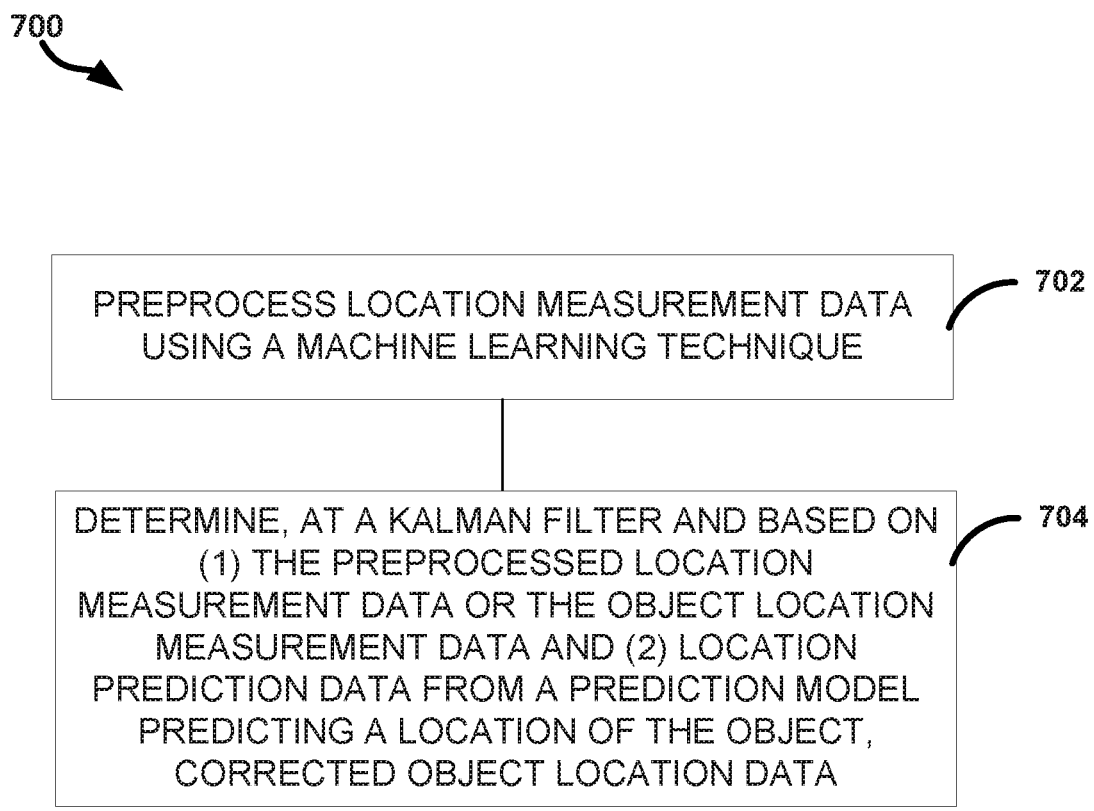
FIG. 7 illustrates, by way of example, a diagram of an embodiment of a method for preprocessing measurement data to reduce reliance on model data.

FIG. 7 illustrates, by way of example, a diagram of an embodiment of a method 700 for preprocessing measurement data to reduce reliance on model data. The method 700 as illustrated includes preprocessing location measurement data using a machine learning technique, at operation 702; determining, by a Kalman filter 308 and based on (1) the preprocessed location measurement data or the object location measurement data and (2) location prediction data from a prediction model predicting a location of the object, corrected object location data; at operation 704. The method 700 can further include providing location data based on the predicted location data and the preprocessed location measurement data. The method 700 can further include determining (1) a covariance of historical object location measurement data and (2) the preprocessed location measurement data with historical object measurement data, and provide the preprocessed location measurement data in response to determining the covariance of the historical object location measurement data is greater than a threshold.

The method 700 can further include, wherein a covariance of the preprocessed location measurement data is less than a covariance of the location measurement data and the Kalman filter is configured to weight data with lower covariance more than data with higher covariance. The method 700 can be performed using a plurality of preprocessors 304 dedicated to operating in respective, different numerical systems, each of the preprocessors configured to preprocess location measurement data using the machine learning technique in the respective, different numerical system.

The method 700 can further include, wherein the machine learning technique is a genetic learning technique with replacement and wherein each parent of a genetic learning technique is an entry of a state transition matrix for the object. The method 700 can further include determining, for each preprocessor, a covariance based on a state transition matrix corresponding to children of an iteration of the genetic learning technique, and feeding back, to each of the preprocessors, the state transition matrix corresponding to the child with the lowest covariance as a parent for the next iteration.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 8:
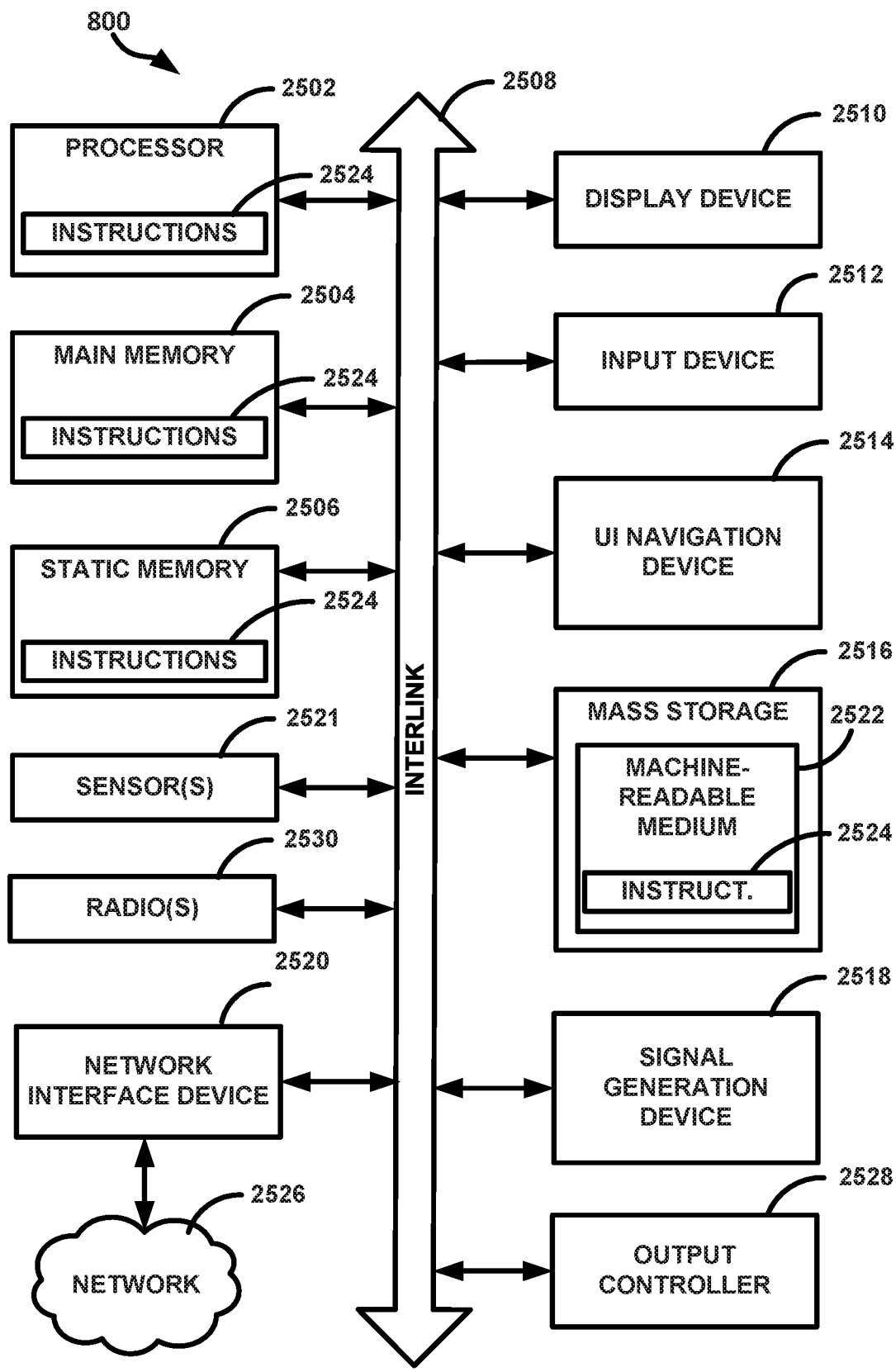
FIG. 8 illustrates, by way of example, a block diagram of an embodiment of a machine in the example form of a computer system within which instructions, for causing the machine to perform any one or more of the methodologies discussed herein, may be executed.

FIG. 8 illustrates, by way of example, a block diagram of an embodiment of a machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 2502 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 2504 and a static memory 2506, which communicate with each other via a bus 2508. The computer system 800 may further include a video display unit 2510 (e.g., a liquid crystal display (LCD) or a cathode ray tube (CRT)). The computer system 800 also includes an alphanumeric input device 2512 (e.g., a keyboard), a user interface (UI) navigation device 2514 (e.g., a mouse), a disk drive unit 2516, a signal generation device 2518 (e.g., a speaker), a network interface device 2520, and radios 2530 such as Bluetooth, WWAN, WLAN, and NFC, permitting the application of security controls on such protocols.

Machine-Readable Medium

The disk drive unit 2516 includes a machine-readable medium 2522 on which is stored one or more sets of instructions and data structures (e.g., software) 2524 embodying or utilized by any one or more of the methodologies or functions described herein. The instructions 2524 may also reside, completely or at least partially, within the main memory 2504 and/or within the processor 2502 during execution thereof by the computer system 800, the main memory 2504 and the processor 2502 also constituting machine-readable media.

While the machine-readable medium 2522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2524 may further be transmitted or received over a communications network 2526 using a transmission medium. The instructions 2524 may be transmitted using the network interface device 2520 and any one of a number of well-known transfer protocols (e.g., HTTP).

Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Example Embodiments

Example 1 includes a device comprising a transceiver 112 configured to receive measurement data (e.g., object location measurement data, velocity data, temperature data, relative orientation data, or the like) from a monitor device, processing circuitry 118 configured to preprocess measurement data (e.g., location measurement data) using a machine learning technique, determine, at a Kalman filter 308 and based on (1) the preprocessed measurement data or the measurement data and (2) prediction data from a prediction model predicting a measurement (e.g., state or value of the measurement being performed (e.g., location, temperature, velocity, or the like)) associated with the measurement data, corrected measurement data, and wherein the transceiver is configured to provide the corrected measurement data based on the predicted data and the preprocessed measurement data.

In Example 2, Example 1 further includes, wherein the processing circuitry is further configured to determine (1) a covariance of historical measurement data and (2) a covariance of the preprocessed measurement data (e.g., with historical measurement data), and provide the preprocessed measurement data in response to determining the covariance of the historical object measurement data is greater than a threshold.

In Example 3, Example 2 further includes, wherein a covariance of the preprocessed measurement data is less than a covariance of the measurement data and the Kalman filter is configured to weight data with lower covariance more than data with higher covariance.

In Example 4, Example 3 further includes, wherein the machine learning technique is a genetic learning technique with crossover.

In Example 5, Example 4 further includes, wherein the processing circuitry includes a plurality of preprocessors dedicated to operating in respective, different numerical systems, each of the preprocessors configured to preprocess measurement data using the machine learning technique in the respective, different numerical system.

In Example 6, Example 5 further includes, wherein each parent of the genetic learning technique is an entry of a state transition matrix for the object.

In Example 7, Example 6 further includes determining, for each preprocessor, a covariance based on a state transition matrix corresponding to children of an iteration of the genetic learning technique, and feeding back, to each of the preprocessors, the state transition matrix corresponding to the child with the lowest covariance as a parent for the next iteration.

Example 8 includes a non-transitory machine-readable medium including instructions that, when executed by a machine, cause the machine to perform operations of the processing circuitry or transceiver of at least one of Examples 1-7.

Example 9 includes a method for performing the operations of the processing circuitry or transceiver of at least one of Examples 1-7.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device comprising:
   a transceiver configured to receive measurement data from a monitor device; and
   processing circuitry configured to:
   preprocess the measurement data using a machine learning technique;
   determine, at a Kalman filter, corrected measurement data based on (1) the preprocessed measurement data or the measurement data and (2) prediction data from a prediction model; and
   wherein the transceiver is further configured to provide the corrected measurement data based on the predicted data and the preprocessed measurement data.

2. The device of claim 1, wherein the processing circuitry is further configured to determine (1) a covariance of historical measurement data and (2) the preprocessed measurement data with the historical measurement data, and provide the preprocessed measurement data in response to determining the covariance of the historical measurement data is greater than a threshold.

3. The device of claim 2, wherein a covariance of the preprocessed measurement data is less than a covariance of the measurement data and the Kalman filter is configured to weight data with lower covariance more than data with higher covariance.

4. The device of claim 3, wherein the machine learning technique is a genetic learning technique with crossover.

5. The device of claim 4, wherein the processing circuitry includes a plurality of preprocessors dedicated to operating in respective, different numerical systems, each of the preprocessors being configured to preprocess measurement data using the machine learning technique in the respective, different numerical system.

6. The device of claim 5, wherein each parent of the genetic learning technique is an entry of a state transition matrix for an object associated with the measurement data.

7. The device of claim 6, wherein each preprocessor is configured to determine a covariance based on a state transition matrix corresponding to children of an iteration of the genetic learning technique, and the processing circuitry is further configured to feed back to the preprocessors, the children with a lowest covariance as a parent for a next iteration.

8. A non-transitory machine-readable medium including instructions that, when executed by a machine, cause the machine to perform operations for preprocessing data for device navigation, the operations comprising:
- receiving location measurement data from a monitor device:
- preprocessing the location measurement data using a machine learning technique resulting in preprocessed location measurement data:
- determining, by a Kalman filter and based on (1) the preprocessed location measurement data or the location measurement data and (2) location prediction data from a prediction model predicting a location of an object associated with the location measurement data, corrected object location data; and
- providing the corrected object location data based on the location prediction data and the preprocessed location measurement data.

9. The non-transitory machine-readable medium of claim 8, wherein the operations further include determining (1) a covariance of historical object location measurement data and (2) the preprocessed location measurement data with historical object measurement data, and provide the preprocessed location measurement data in response to determining the covariance of the historical object location measurement data is greater than a threshold.

10. The non-transitory machine-readable medium of claim 9, wherein a covariance of the preprocessed location measurement data is less than a covariance of the location measurement data and the Kalman filter is configured to weight data with lower covariance more than data with higher covariance.

11. The non-transitory machine-readable medium of claim 10, wherein the machine learning technique is a genetic learning technique with crossover.

12. The non-transitory machine-readable medium of claim 11, wherein the machine includes a plurality of preprocessors dedicated to operating in respective, different numerical systems, each of the preprocessors configured to preprocess location measurement data using the machine learning technique in the respective, different numerical system.

13. The non-transitory machine-readable medium of claim 12, wherein each parent of the genetic learning technique is an entry of a state transition matrix for the object.

14. The non-transitory machine-readable medium of claim 13, wherein the operations further comprise determining, for each preprocessor, a covariance based on a state transition matrix corresponding to children of an iteration of the genetic learning technique, and feeding back, to each of the preprocessors, the state transition matrix corresponding to a child with a lowest covariance as a parent for a next iteration.

15. A method for preprocessing data for device operation, the method comprising:
- receiving location measurement data from a monitor device;
- preprocessing the location measurement data using a machine learning technique resulting in preprocessing measurement data;
- determining, by a Kalman filter and based on (1) the preprocessed measurement data or the measurement data and (2) location prediction data from a prediction model predicting a measurement associated with the location measurement data, corrected measurement data; and
- providing the corrected measurement data based on the location prediction data and the preprocessed measurement data.

16. The method of claim 15, wherein the location measurement data is object location data, the method further comprising determining (1) a covariance of historical object location measurement data and (2) the preprocessed location measurement data with historical object measurement data, and provide the preprocessed location measurement data in response to determining the covariance of the historical object location measurement data is greater than a threshold.

17. The method of claim 16, wherein a covariance of the preprocessed location measurement data is less than a covariance of the location measurement data and the Kalman filter is configured to weight data with lower covariance more than data with higher covariance.

18. The method of claim 17, wherein the method is performed using a plurality of preprocessors dedicated to operating in respective, different numerical systems, each of the preprocessors configured to preprocess the location measurement data using the machine learning technique in the respective, different numerical system.

19. The method of claim 18, wherein the machine learning technique is a genetic learning technique with replacement and wherein each parent of a genetic learning technique is an entry of a state transition matrix for the object.

20. The method of claim 15, wherein the location measurement data includes at least one of object location measurement data, object velocity data, object temperature data, object relative orientation.

* * * * *